United States Patent
Han et al.

(10) Patent No.: US 10,616,268 B2
(45) Date of Patent: Apr. 7, 2020

(54) ANOMALY DETECTION METHOD FOR THE VIRTUAL MACHINES IN A CLOUD SYSTEM

(71) Applicant: Shanghai Maritime University, Shanghai (CN)

(72) Inventors: Dezhi Han, Shanghai (CN); Kun Bi, Shanghai (CN); Haochen Han, Shanghai (CN); Jun Wang, Shanghai (CN); Bolin Xie, Shanghai (CN); Fumei Chen, Shanghai (CN)

(73) Assignee: Shanghai Maritime University, Shanghai (CN)

( * ) Notice: Subject to any disclaimer, the term of this patent is extended or adjusted under 35 U.S.C. 154(b) by 14 days.

(21) Appl. No.: 15/736,227

(22) PCT Filed: Oct. 12, 2016

(86) PCT No.: PCT/CN2016/101891
§ 371 (c)(1),
(2) Date: Dec. 13, 2017

(87) PCT Pub. No.: WO2017/118133
PCT Pub. Date: Jul. 13, 2017

(65) Prior Publication Data
US 2018/0309770 A1      Oct. 25, 2018

(30) Foreign Application Priority Data

Jan. 7, 2016   (CN) .......................... 2016 1 0008093

(51) Int. Cl.
*H04L 29/06*      (2006.01)
*G06N 20/00*      (2019.01)
(Continued)

(52) U.S. Cl.
CPC ............ *H04L 63/145* (2013.01); *G06F 9/455* (2013.01); *G06F 9/45558* (2013.01);
(Continued)

(58) Field of Classification Search
CPC ............ H04L 63/1416; H04L 63/1425; H04L 63/145; H04L 67/10; G06F 11/0712;
(Continued)

(56) References Cited

U.S. PATENT DOCUMENTS 7,499,842 B2 *   3/2009   Grichnik ............. F02D 41/1401
                                                             703/2
8,862,727 B2    10/2014   Jayachandran et al.
(Continued)

FOREIGN PATENT DOCUMENTS

| CN | 103428026 A | 12/2013 |
|---|---|---|
| CN | 105511944 A | 4/2016 |
| CN | 105791286 A | 7/2016 |

OTHER PUBLICATIONS

Yongli, Zhao, et al. "An improved feature selection algorithm based on MAHALANOBIS distance for network intrusion detection." Proceedings of 2013 International Conference on Sensor Network Security Technology and Privacy Communication System. IEEE, 2013. (Year: 2013).*

(Continued)

*Primary Examiner* — Syed A Zaidi
(74) *Attorney, Agent, or Firm* — Amster, Rothstein & Ebenstein LLP

(57) ABSTRACT

An anomaly detection method for virtual machines in a cloud system, in which an HsMM is trained by searching the state information of the normal virtual machines in the cloud system, and a corresponding algorithm is designed to detect and calculate the probabilistic logarithm probability and the Mahalanobis distance of the dynamic changing behaviors of the resources in the cloud system when each virtual machine is online. If the Mahalanobis distance value of an online virtual machine is detected being higher than the preset (Continued)

threshold value of the cloud system, it is suggested that the virtual machine is operating anomalously.

6 Claims, 2 Drawing Sheets

(51) Int. Cl.
| | |
|---|---|
| *G06F 9/455* | (2018.01) |
| *G06F 21/55* | (2013.01) |
| *G06N 7/00* | (2006.01) |
| *H04L 29/14* | (2006.01) |
| *G06F 11/07* | (2006.01) |
| *G06N 7/08* | (2006.01) |
| *H04L 29/08* | (2006.01) |

(52) U.S. Cl.
CPC ........ *G06F 11/076* (2013.01); *G06F 11/0709* (2013.01); *G06F 11/0712* (2013.01); *G06F 11/0772* (2013.01); *G06F 11/0793* (2013.01); *G06F 21/554* (2013.01); *G06N 7/005* (2013.01); *G06N 7/08* (2013.01); *G06N 20/00* (2019.01); *H04L 63/1416* (2013.01); *H04L 63/1425* (2013.01); *H04L 67/10* (2013.01); *H04L 69/40* (2013.01); *G06F 2009/45575* (2013.01); *G06F 2009/45587* (2013.01); *G06F 2009/45591* (2013.01); *G06F 2009/45595* (2013.01)

(58) Field of Classification Search
CPC ............... G06F 11/076; G06F 11/0772; G06F 11/0793; G06F 2009/45575; G06F 2009/45595; G06F 2009/45591; G06F 2009/45587
USPC .......................................................... 726/24
See application file for complete search history.

(56) References Cited

U.S. PATENT DOCUMENTS

| | | | | |
|---|---|---|---|---|
| 2009/0292386 | A1* | 11/2009 | Cheng | G05B 19/41875 700/109 |
| 2012/0304244 | A1* | 11/2012 | Xie | G06F 21/00 726/1 |
| 2013/0305092 | A1* | 11/2013 | Jayachandran | G06F 11/0754 714/37 |
| 2014/0201738 | A1* | 7/2014 | Choi | G06F 9/45533 718/1 |
| 2016/0062782 | A1* | 3/2016 | Liu | G06F 9/45558 718/1 |

OTHER PUBLICATIONS

NPL Search Results (Year: 2020).*
International Search Report (English Translation) for International Patent Application No. PCT/CN2016/101891, dated Dec. 30, 2016.
Written Opinion for International Patent Application No. PCT/CN2016/101891, dated Dec. 30, 2016.

* cited by examiner

ANOMALY DETECTION METHOD FOR THE VIRTUAL MACHINES IN A CLOUD SYSTEM

This application is a National Stage entry under 35 U.S.C. 371 of International Patent Application No. PCT/CN2016/101891, filed on Oct. 12, 2016, which claims the benefit of and priority to Chinese Patent Application No. CN 201610008093.1, filed on Jan. 7, 2016, the entire contents of each of which are incorporated by reference herein.

TECHNICAL FIELD

This invention relates to the field of network technologies, and more particularly, an anomaly detection method for the virtual machines in a cloud system.

BACKGROUND

More and more companies and enterprises have been increasingly reducing their costs by transferring some of their infrastructures of information technology to providers of cloud system services, such as data centers with distributed storage infrastructures and other types of cloud computing systems. Such providers of cloud system services have established various types of virtual infrastructures, including private and public cloud systems with commercially virtualized software such as Vmware and vSphere. The data of such cloud systems can be distributed to hundreds of interconnecting computers, storage devices and other physical machines.

In a public or private cloud system, enterprises that rent computing and storage resources from providers of cloud system services are called cloud renter. When they store their data in a cloud system, the security of their data is at the risk of being attacked outside. For instance, a provider of the cloud system services may establish multiple virtual machines for different renter in one physical host; if one of the virtual machines malfunctions because of internal viruses or external attacks, the data security of the other virtual machines in the same physical host of the cloud system is threatened.

The anomalous virtual machine can enormously threaten the normal operations of the other virtual machines sharing the same physical host and hinder the cloud system from providing services to the other normal virtual machines, endangering the security of the cloud system. Currently, there are a few anomaly detection methods for detecting anomalies of the virtual machines in a cloud system, and the existing defensive technologies have failed to monitor the dynamic changes of the virtual machines in a cloud system, which are deficient in performance to a certain degree.

It is of great significance to guarantee the availability of a cloud system for its normal virtual machines, specifically in the following two aspects: the first is to provide reasonable resource distribution services for the normal use of the virtual machines; the second is to check the availability of the other normal virtual machines when one virtual machine in the cloud system becomes anomalous, i.e. to detect and remove the anomalies so as to guarantee the normal use of the other normal virtual machines in the cloud system.

DETAILED DESCRIPTION OF THE INVENTION

This invention provides a real-time reliable anomaly detection method for the virtual machines in a cloud system, which can reduce the impact of anomaly detection on the global operation of the cloud system and ensure the availability of the normal virtual machines in the cloud system for its users.

To fulfill that purpose, the invention provides an anomaly detection method for the virtual machines in a cloud system:

A search module for Searching the virtual machine's state attribute information can search for the state attribute information of each virtual machine in a cloud system and then send the information to an HsMM (Hidden semi-Markov Model) online detection module in real time for anomaly detection;

The above-mentioned HsMM online detection module can detect any anomaly of the virtual machines and send the state attribute information of the anomalous virtual machines to a detection and treatment system in the cloud system to remove the anomalies;

The above-mentioned anomaly detection and treatment system will detect any anomalous virtual machine in the cloud system, remove the anomalies and send warnings to its corresponding cloud renter if the anomaly degree has not reached the preset index of the cloud system. And if the anomaly degree has reached the preset index, the anomaly detection and treatment system will send warnings to its corresponding cloud renter and shut down each anomalous virtual machine.

The aforementioned anomaly detection method for the virtual machines in a cloud system comprises the following steps:

Step 1: Search the state attribute value of each virtual machine in the normal state in a cloud system through a module searching the virtual machine's attribute information; the normal state herein refers to the state of a virtual machine without any internal virus or external attack;

Step 2: Take the state attribute value of each virtual machine in the normal state as an observation sequence, train an HsMM and design an HsMM online detection algorithm;

Step 3: Search the online state information of each virtual machine in the cloud with a module searching the virtual machine's state attribute information in accordance with a preset time interval of the cloud system, and send the information to the HsMM online detection module in real time;

Step 4: The aforementioned HsMM online detection module, which is based on an algorithm obtained from Step 2, can detect the state and behavior of each virtual machine online and calculate its probabilistic logarithm probability and the Mahalanobis distance so as to judge whether the virtual machine is anomalous or not;

Step 5: Make a comparison between the Mahalanobis distance calculated by the online behavior of each virtual machine with the preset threshold value Q of the cloud system, and judge whether the Mahalanobis distance value of the online behavior of each virtual machine is higher than the threshold value Q. If the former is higher than the latter, turn to Step 6; if not, turn to Step 3;

Step 6: Start the anomaly detection and treatment system of the cloud system, and detect each virtual machine whose detection result is higher than the preset threshold value Q of the cloud system;

Step 7: Judge whether the anomaly index of each virtual machine detected in Step 6 is higher than the maximum preset threshold value $E_{max}$ of the anomaly detection and treatment system.

If the anomaly index is equal to or higher than the maximum threshold value $E_{max}$, turn to Step 8;

If the anomaly index is lower than $E_{max}$, the anomaly detection and treatment system will remove the anomaly and send warnings to the corresponding cloud renter and then turn to Step 3;

Step 8: The anomaly detection and treatment system will send warnings to the corresponding cloud renter when the anomaly index of one virtual machine in the cloud system is equal to or higher than the maximum threshold value $E_{max}$ and shut down that virtual machine.

The present invention has the following advantages and effects:

1. It guarantees a real-time judgment of any anomalous virtual machine in a cloud system. To search for and transfer the state attribute information of each virtual machine through a lightweight module searching the virtual machine's state attribute information, and the lightweight HsMM online detection algorithm can rapidly detect a virtual machine whose state and behavior are anomalous. The detection speed is much faster than that of any of the commonly used anomaly detection softwares for the virtual machines in a cloud system in that traditional anomaly detection methods would detect the anomalies of the virtual machines in a cloud system at intervals or start the anomaly detection when a virtual machine is found working anomalously.

2. It improves the accuracy of judging an anomalous virtual machine in a cloud system. After one anomalous virtual machine is detected by the lightweight HsMM online detection algorithm, the anomaly detection and treatment system comprising multiple isomeric detection engines can start to detect any virtual machine with anomalous behavior; and the double anomaly detection method greatly improves the accuracy of judging an anomalous virtual machine in a cloud system.

3. It sufficiently guarantees the availability of the normal virtual machines in a cloud system. On the one hand, both the lightweight module for searching the state attribute information of the virtual machines and the lightweight HsMM online detection algorithm have no impact on the operation of the normal virtual machines in the cloud system; on the other hand, the anomaly detection and treatment system only detects the virtual machines with anomalous behaviors, not occupying the resources and time of the normal virtual machines in the cloud system. Therefore, this invention sufficiently guarantees the availability of the normal virtual machines in the cloud system.

BRIEF DESCRIPTION OF THE DRAWINGS

To make this invention and its advantages fully understood, the drawings in connection with it are described as follows.

PREFERRED EMBODIMENTS

In order to make the present invention's technical method, innovational features, purpose and effects easy to be understood, related illustrations and specific embodiments are combined to further expound an anomaly detection method for the virtual machines in a cloud system.

Figure 1:
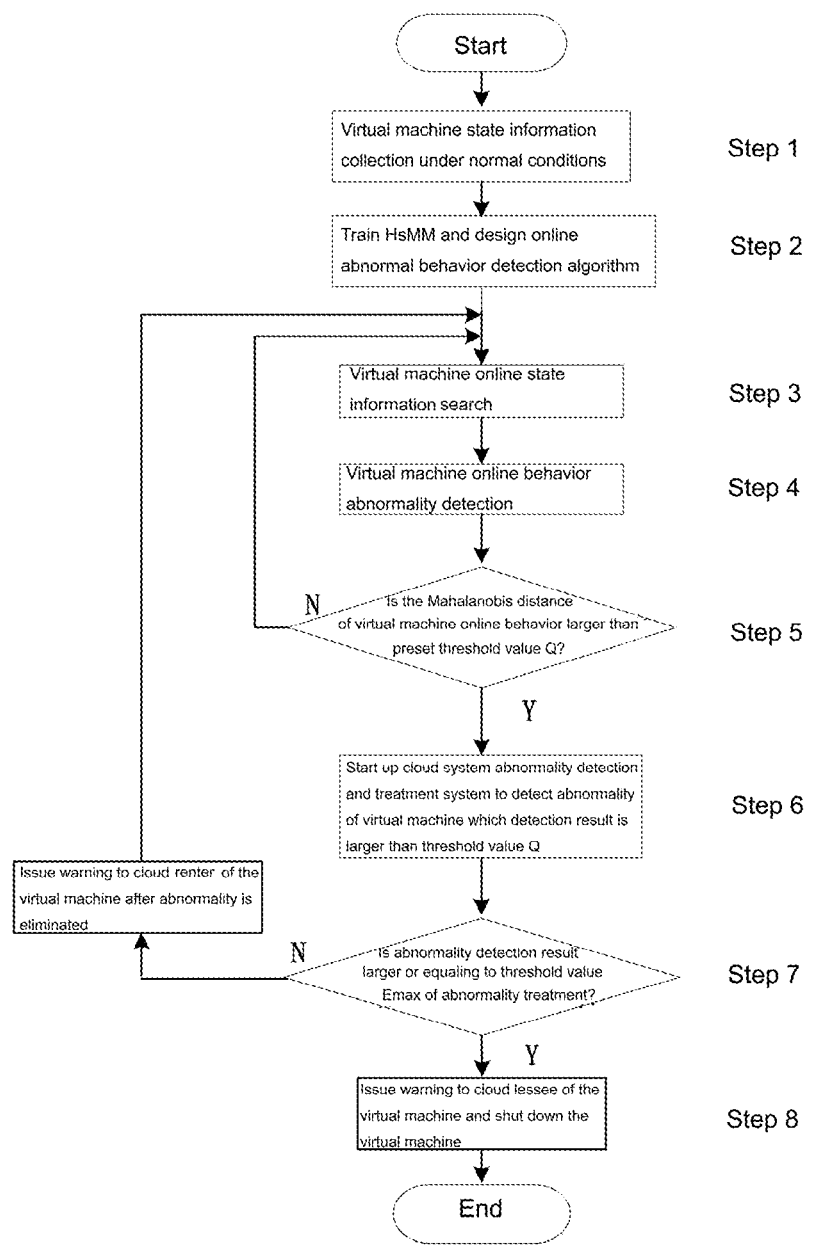
FIG. 1 is an entire flow chart of this invention.
Figure 2:
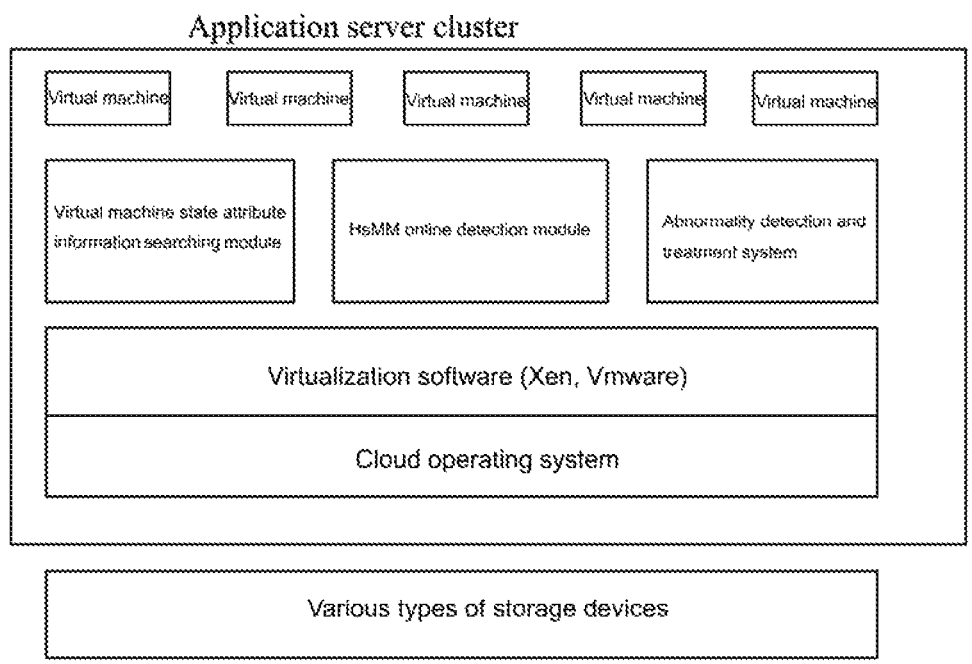
FIG. 2 is the structural diagram of a cloud system.

FIG. 1 shows a process flow chart of an anomaly detection method for the virtual machines in a cloud system provided by this invention; FIG. 2 is a structural diagram of the cloud system in connection with this invention.

The aforementioned cloud system of this invention comprises an application server cluster and various storage devices. The application server cluster is installed with a cloud operation system, a virtualization software, a virtual machine's state attribute information searching module, an HsMM online detection module, a virtual machine's anomaly detection and treatment system, and some virtual machines built for cloud renters.

The cloud operating system is an operating system supported by cloud computing and cloud storage technology, an overall management operation system of a cloud computing background data center, and a cloud platform for a comprehensive management system based on some basic hardware resources such as a server, a storage and a network and some basic softwares such as a stand-alone operating system, a middleware and a database. And the cloud operating system can manage massive resources of basic hardwares and softwares.

The virtualization software is a software which can allow one host server to set up and implement one or more virtual environments, such as VMware and Xen.

The virtual machine's state attribute information searching module is a lightweight software module realized by performing the virtual machine's state attribute information searching function in the cloud system; the lightweight software module refers to an application's software which occupies few system resources and affects little on the entire cloud system in operation.

The HsMM online detection module includes an HsMM online detection algorithm which can detect the online anomalous behaviors of the virtual machines in the cloud system.

The anomaly detection and treatment system comprises isomeric detection engines produced by different manufacturers, and can efficiently detect the internal viruses and external attacks for the virtual machines with anomalous behaviors in the cloud system, including both the open-source and non open-source detection engines.

The aforementioned virtual machine's anomaly detection and treatment process of the application comprises:

(1) the virtual machine's attribute information searching module which can search for the normal state attribute value of each virtual machine and send it to the HsMM online detection module in real time;

(2) the HsMM online detection module which can rapidly detect any virtual machine with anomalous behavior based on the corresponding algorithm and send the relevant information to the virtual machine's anomaly detection and treatment system;

(3) the virtual machine's anomaly detection and treatment system which can detect any anomalous virtual machine and remove the anomalies, sending warnings to its corresponding cloud renter if the anomaly degree of the anomalous virtual machine is low; sending warnings to the corresponding cloud renter and shutting down the anomalous virtual machine if its anomaly degree is high.

In accordance with the aforementioned treatment process, the double anomaly detection method adopted by the present invention can improve the accuracy of judging an anomalous virtual machine in a cloud system and sufficiently guarantees the high availability of the normal virtual machines.

As shown in FIG. 1, the anomaly detection method for the virtual machines in a cloud system comprises the following steps:

Step 1: The virtual machine's attribute information searching module searches for the normal state attribute value of each virtual machine in a cloud system;

The normal state refers to the state of a virtual machine without any viruses inside or attacks outside the cloud system.

The state information of each virtual machine in the cloud system comprises its attribute value showing the normal or anomalous operation of each virtual machine, including the CPU use ratio, the GPU use ratio, the I/O waiting time, the memory use ratio, and its dynamic changes over time.

Step 2: Take the state attribute value of each virtual machine in a normal state as an observation sequence, train an HsMM and design an HsMM online detection algorithm (specifically stated below);

Step 3: Search for the state information of each virtual machine for the online operation with the virtual machine's state attribute information searching module at a preset time interval and send the state information to the HsMM online detection module in real time;

Step 4: The HsMM online detection module, based on the algorithm obtained in Step 2, can detect the state and behavior of each virtual machine online and calculate the probabilistic logarithm probability and the Mahalanobis distance of its state and behavior so as to judge the anomalous behaviors of each virtual machine;

The aforementioned anomalous behaviors refer to the anomalies of the virtual machine's performance index changes in terms of its CPU use ratio, GPU use ratio, I/O waiting time and memory use ratio, or the virtual machine's resource depletion or gradual performance degradation.

Step 5: Make a comparison between the Mahalanobis distance value calculated by the online behavior of each virtual machine and the preset threshold value Q of the cloud system, and judge whether the former is higher than the latter: if it is, turn to Step 6; if not, turn to Step 3; The preset threshold value Q is the minimum acceptable standard of the anomaly detection result of each virtual machine in the cloud system.

Step 6: Start the anomaly detection and treatment system in the cloud system and detect the anomaly of each virtual machine in the cloud system, whose detection result is higher than the preset threshold value Q; The mentioned anomaly detection is to detect the internal viruses and external attacks comprehensively for each virtual machine with anomalous behaviors.

Step 7: Judge whether the anomalous index of each virtual machine detected in Step 6 is higher than the maximum preset threshold value of the anomaly detection and treatment $E_{max}$: if the anomalous index is equal to or higher than the maximum threshold value $E_{max}$, turn to Step 8; if it is lower than $E_{max}$, the anomaly detection and treatment system will remove the anomalies and issue warnings to the corresponding cloud renter and turn to Step 3. The maximum preset threshold value $E_{max}$ is the maximum anomaly index that the anomaly detection and treatment system can deal with.

Step 8: The anomaly detection and treatment system will issue warnings to the corresponding cloud renter when the anomalous index of a virtual machine is equal to or higher than the maximum threshold value $E_{max}$ and shut down the virtual machine.

The process of designing the HsMM online detection algorithm by training the HsMM will be explained below.

The HsMM can be expressed by $\lambda=\{S, \pi, A, B, P\}$, and each parameter can be defined as follows:

S is the state set of the model, $S=\{s_1, s_2, \ldots, s_G\}$, in which, $s_g(1 \leq g \leq G)$ means the possible state of the HsMM at time t, and G is the total number of the model states (State);

$\pi$ is the probability matrix of the initial state, $\pi=\{\pi_g\}$, $\pi_g=Pr[q_1=s_g]$, $1 \leq g \leq G$, in which, $\Sigma_g \pi_g=1$. $\pi_g$ means the possibility of the HsMM in the state $s_g$ at time 1;

A is the state transfer probability matrix, $A=\{a_{gi}\}, a_{gi}=Pr[q_{t+1}=s_i|q_t=s_g]$, $1 \leq g, i \leq G$, in which, $\Sigma_i a_{gi}=1$, $q_t$ means the possible state of the HsMM at time t, and $a_{gi}$ means the possibility of the HsMM at time t transferring from the state $s_g$ to the state $s_i$;

B is the observation value probability matrix, $B=\{b_g(v_k)\}$, $b_g(v_k)=Pr[O_t=V_k|q_t=s_g]$, $1 \leq k \leq K$, $1 \leq g \leq G$, in which, $O_t$ means the observation value of the HsMM at time t, and $b_g(v_k)$ means the probability of the HsMM in the state $s_g$, at time t and the observation value $O_t=V_k$, K is the maximum length of the observation sequence;

P is the state sustainability probability matrix, $P=\{p_g(d); 1 \leq d \leq D, 1 \leq g \leq G\}$, $p_g(d)=Pr[\tau_t=d|q_t=s_g]$ means the probability of the model in the state at time $s_g$ and will remain in the state $s_g$ until time d, wherein D means the maximum time for the model's state sustainability.

In the above model, the attribute value state of each virtual machine in a cloud system comprises the following:

State ①: The use ratio of the CPU, GPU and memory of each virtual machine is lower than 30%, and the virtual machine's I/O waiting time is short;

State ②: The use ratio of one or more of the CPU, GPU and memory is higher than 30% but lower than 50%, and that of the others is lower than 30%; and the virtual machine's I/O waiting time is normal;

State ③: The use ratio of one or more of the CPU, GPU and memory is higher than 50% but lower than 80%, and that of the others is lower than 50%; and the virtual machine's I/O waiting time is normal;

State ④: The use ratio of one of the CPU, GPU and memory of each virtual machine is higher than 80% but lower than 90%, and that of the others is lower than 80%, and their changes are normal; and the virtual machine's I/O waiting time is long;

State ⑤: The use ratio of one or more of the CPU, GPU and memory of each virtual machine is higher than 80% but lower than 90% and that of the others is lower than 80%, and their changes are anomalous; and the virtual machine's I/O waiting time is rather long or very long;

State ⑥: The use ratio of one or more of the CPU, GPU and memory is higher than 90%, and that of the others is lower than 80% and their changes are anomalous; and the virtual machine's I/O waiting time is very long;

States ①-④ belong to the normal state, and states ⑤-⑥ are anomalous.

The present invention trains the HsMM with the observation sequence of the attribute state of the virtual machine in the normal state, wherein the process is as follows:

S1. Calculate the forward variable $\alpha_t^{(h)}(g,d)$ of the state information observation sequence $O^{(h)}(1 \leq h \leq H)$ for every virtual machine, which means the probability of the virtual machine remaining in the state $s_g$ until time d when the initial t observation samples $o_1^t$ in the observation sequence arrives at the virtual machine's attribute information searching module, where $1 \leq t \leq T^*$. And the definition of the forward variable is shown in FIG. 1):

$$\alpha_t^{(h)}(g,d)=P_r[(o_1^t)_h,(q_t,\tau_t)=(s_g,d)] \qquad (1)$$

wherein H is the total number of the virtual machine's state values of the observation sequence, and T* is the length of the corresponding observation sequence;

S2. Calculate the probabilistic logarithm probability $P_h$ of each normal virtual machine's observation sequence corresponding to the HsMM according to formula (2), $1 \le h \le H$; similarly, calculate the probabilistic logarithm probability $P_{h*}$ of the online normal virtual machine according to formula (3); on that basis, calculate the probabilistic logarithm probability $P_H$ of all normal virtual machine's observation sequence corresponding to the HsMM according to formula (4), where $P_H$ is the initial probabilistic logarithm probability distribution constituted by the probabilistic logarithmic value of the normal virtual machine, $$P_h = \ln(P(O^{(h)}|\lambda)) = \ln(\Sigma_{g=1}^{G} \Sigma_{d=1}^{D} \alpha_{T^*}^{h}((g,d))) \quad (2)$$

$$P_{h*} = \ln(P(O^{(h*)}|\lambda)) = \ln(\Sigma_{g=1}^{G} \Sigma_{d=1}^{D} \alpha_{T^*}^{h*}((g,d))) \quad (3)$$

$$P_H = \Pi_{h=1}^{H} \ln(P(O^{(h)}|\lambda)) = \Pi_{h=1}^{H} P_h \quad (4)$$

wherein G is the total number of the model states, D is the longest time of the state sustainability, and H is the total number of the virtual machine's state observation sequence, and T* is the length of the corresponding observation sequence;

S3. According to formulas (5) and (6), calculate the mean value $\mu$ and the standard deviation $\sigma$ of the initial probabilistic logarithm probability distribution $P_H$ respectively:

$$\mu = \frac{P_H}{H} \quad (5)$$

$$\sigma = \sqrt{\frac{1}{H-1} \sum_{h=1}^{H} (P_h - \mu)^2} \quad (6)$$

S4. Calculate the backward variable $\beta_q^{(h)}(g,d)$ of each observation sequence $Q^{(h)}(1 \le h \le H)$ of each virtual machine, which means the probability of occurring the observation sample $o_{t+1}^{T^*}$ when the observation sample $o_1^t$ at time t arrives at the virtual machine's attribute information searching module and under the condition that the virtual machine sustainably stays in the state $s_g$ until time d. And the definition of the backward variable can be seen in formula (7):

$$\beta_t^{(h)}(g,d) = P_r[(o_{t+1}^{T^*})_h | (q_t, \tau_t) = (s_g, d)] \quad (7)$$

S5. According to the forward variable $\alpha_t^{(h)}(g,d)$ and the backward variable $\beta_t^{(h)}(g,d)$, a joint probability of the state shift re $\xi_t^{(h)}(g,l)$, a joint probability of the sustained state $\eta_q^{(h)}(g,d)$, and a joint probability of the state and the observation value $\gamma_t^{(h)}(g)$; and their definition equations are respectively shown in (8), (9) and (10):

$$\xi_t^{(h)}(g,i) = P_r[O^{(h)}, q_{t-1} = s_g, q_t = s_i] \quad (8)$$

$$\eta_t^{(h)}(g,d) = P_r[O^{(h)}, q_{t-1} \ne s_g, q_t = s_g, \tau_t = d] \quad (9)$$

$$\gamma_t^{(h)} = P_r[O^{(h)}, q_t = s_g] \quad (10)$$

S6. Train the model parameters of the HsMM: before training the model parameters, assign the initial value to the model parameters of the HsMM; since the initial value of the parameter A, P, B, $\pi$ affects little on the model training, make $a_{gi} = 1/(G-1)$, $\pi_g = 1/G$, $p_g(d) = 1/D$, $b_g(v_k) = 1/(G-1)$; besides, make the state voluntary shift probability $a_{gg} = 0$, and upgrade the parameters according to formulas (11)-(14), and in formula (13), when $o_t = v_k$, $\delta(o_t - v_k) = 1$; otherwise, $\delta(o_t - v_k) = 0$, $$\pi_g = \frac{\sum_{h=1}^{H} \frac{1}{P_h} \gamma_1^{(h)}(g)}{\sum_{h=1}^{H} \frac{1}{P_h} \sum_{g=1}^{G} \gamma_1^{(h)}(g)} \quad (11)$$

$$a_{gi} = \frac{\sum_{h=1}^{H} \frac{1}{P_h} \sum_{t=2}^{T^*} \xi_t^{(h)}(g,i)}{\sum_{h=1}^{H} \frac{1}{P_h} \sum_{g=1}^{G} \sum_{t=2}^{T^*} \xi_t^{(h)}(g,i)} \quad (12)$$

$$b_g(v_k) = \frac{\sum_{h=1}^{H} \frac{1}{P_h} \sum_{t}^{T^*} \gamma_t^{(h)}(g) \delta(o_t - v_k)}{\sum_{h=1}^{H} \frac{1}{P_h} \sum_{k=1}^{K} \sum_{t}^{T^*} \gamma_t^{(h)}(g) \delta(o_t - v_k)} \quad (13)$$

$$p_g(d) = \frac{\sum_{h=1}^{H} \frac{1}{P_h} \sum_{t=1}^{T^*} \eta_t^{(h)}(g,d)}{\sum_{h=1}^{H} \frac{1}{P_h} \sum_{d=1}^{D} \sum_{t=1}^{T^*} \eta_t^{(h)}(g,d)} \quad (14)$$

S7. Judge whether $P_H$ obtained in S2 is a stable value; if it is, the HsMM model parameter set $\lambda$ is obtained, where the model training ends; if not, repeat the process from S1 to S6.

After the initial probabilistic logarithm probability distribution of the normal virtual machine and the probabilistic logarithm probability calculation equation of the online virtual machine are obtained, the distance between them can be measured by a simplified Mahalanobis distance. The simplified Mahalanobis distance can be expressed by formula (15):

$$d = \sum_{h^*=1}^{H} \left| \frac{P_{h^*} - \mu}{\sigma} \right| \quad (15)$$

The value of d in formula (15) shows the anomaly degree of each virtual machine's online state and behavior in the cloud system, wherein a threshold value Q, which represents the normal behavior of the virtual machine, can be defined; when $d \le Q$, the state of the virtual machine is normal; when $d > Q$, the virtual machine may be affected by internal viruses or external attacks in the cloud system. The aforementioned Mahalanobis distance is a method calculating the distance between two relevant points proposed by an Indian mathematician P. C. Mahalanobis.

When one anomaly virtual machine is obtained, the anomaly detection and treatment system in the cloud system starts to detect the anomaly and appraise the detection result of the internal viruses and external attacks to get an anomaly degree index of the virtual machine $E_i$, $E_i = \rho_1 + \rho_2$; $\rho_1$ is an index showing whether the anomalous virtual machine's internal virus can be treated. If the virus is treatable, $\rho_i$ should be 0; if not, $\rho_1$ should be 1. $\rho_2$ is an index showing whether the anomalous virtual machine's external attack can be treated. If the external attack is treatable, $\rho_2$ should be 0; and if not, $\rho_2$ should be 1.

If the anomaly degree index of the virtual machine $E_i < E_{max} = 1$, the system will remove the anomaly and issue warnings to the cloud renter of the corresponding virtual machine; if the anomaly degree index $E_i \geq E_{max}=1$, the system will issue warnings to the cloud renter of the corresponding virtual machine and shut it down.

An embodiment is illustrated to explain the method used in this invention.

Suppose the cloud system sets 100 virtual machines, among which one is anomalous due to virus, and the other two are anomalous due to external attack. After the lightweight virtual machine's state attribute information searching module search the state information of each virtual machine and sends it to the HsMM online detection module, the latter will rapidly detect the anomalous behavior of these 3 virtual machines based on the HsMM online detection algorithm, and then the anomaly detection and treatment system will start to detect and treat the anomalies of these 3 virtual machines.

Since the virtual machine's attribute information searching module and the HsMM online detection module nearly have no impact on all virtual machines, wherein their impact is neglected. Suppose the anomaly of the virtual machine caused by any virus and external attack can be removed without shutting down the virtual machine; besides, 10 minutes is required to remove the anomaly of each virtual machine, then the total time required to remove the anomalies of these 3 virtual machines should be 3×10=30 minutes.

The traditional way to remove the virtual machine's anomalies is to start an anomaly detection and treatment system in a cloud system to detect all the virtual machines; then the total time required to remove the anomalies of the 3 virtual machines should be 100×10=1000 minutes.

Moreover, in this invention, only the 3 anomalous virtual machines need to be detected and removed, while in the traditional methods, all virtual machines need to be detected, including both the anomalous and normal virtual machines. And the anomaly detection and treatment of a virtual machine need to occupy its resources and operating time.

According to the aforesaid embodiment, this invention can sufficiently ensure the real-time performance and accuracy of the anomaly detection and treatment of the virtual machines in a cloud system, with high availability of the normal virtual machine compared with the traditional method.

Although the contents of this invention have been described by the aforesaid optimal embodiment in detail, the aforesaid description should not be deemed as a limit to this invention. After technicians in this field read the aforesaid contents, multiple revisions and replacements of this invention will be evident. Therefore, the protection scope of this invention should be restricted by the claims attached.

The invention claimed is:

1. An anomaly detection method for virtual machines in a cloud system, wherein,
   a virtual machine's state attribute information searching module searches for state attribute information of each virtual machine in the cloud system and sends the aforementioned state attribute information to an HsMM online detection module in real time for anomaly detection;
   the HsMM online detection module detects a virtual machine with anomalous behavior and sends the state attribute information of each anomalous virtual machine to an anomaly detection and treatment system of the virtual machines in the cloud system;
   the virtual machine's anomaly detection and treatment system detects any anomalous virtual machine, removes its anomaly and issues warnings to the corresponding cloud renter when its anomaly degree has not reached a preset index of the cloud system; and
   the detection and treatment system issues warnings to the corresponding cloud renter and shuts down the anomalous virtual machine when its anomaly degree has reached the preset index of the cloud system; wherein,
   the method comprises the following steps:
   step 1: searching a state attribute value of each virtual machine in a normal state in the cloud system through a module searching virtual machine attribute information;
   the normal state herein refers to the state of the virtual machine without any internal virus or external attack:
   step 2: taking the state attribute value of each virtual machine in tihe normal state as an observation sequence, and
   training an HsMM and design an HsMM online detection algorithm;
   step 3. searching the online state information of each virtual machine in the cloud with a module;
   searching the virtual machine's state attribute information in accordance with a preset time interval of the cloud system, and
   sending the information to the HsMM online detection module in real time;
   step 4: detecting, by the HsMM online detection module, which is based on an algorithm obtained from step 2, the state and behavior of each virtual machine online and calculating its probabilistic logarithm probability and the Mahalanobis distance so as to judge whether the virtual machine is anomalous;
   step 5: comparing the Mahalanobis distance calculated by the online behavior of each virtual machine with the preset threshold value Q of the cloud system, and judging whether the Mahalanobis distance value of the online behavior of each virtual machine is higher than the threshold value Q, and
   when the former is higher than the latter, turn to step 6;
   when the former is not higher than the latter, return to step 3;
   step 6: starting the anomaly detection and treatment system of the cloud system, and detecting each virtual machine whose detection result is higher than the preset threshold value Q of the cloud system;
   step 7: determining whether the anomaly index of each virtual machine detected in 6 is higher than a maximum preset threshold value $E_{max}$ of the anomaly detection and treatment system; and
   when the anomaly index is equal to or higher than the maximum threshold value $E_{max}$, turn to step 8;
   when the anomaly index is lower than $E_{max}$, the anomaly detection and treatment system removes the anomaly and sends warnings to the corresponding cloud renter and then returns to step 3;
   step 8: sending, by the anomaly detection and treatment system, warnings to the corresponding cloud renter when the anomaly index of one virtual machine in the cloud system is equal to or higher than the maximum threshold value $E_{max}$ and shutting down that virtual machine.

2. The anomaly detection method for the virtual machines in a cloud system of claim 1, wherein,
   the state attribute value of the virtual machine comprises the CPU use ratio, GPU use ratio, I/O waiting time and memory use ratio, as well as their dynamic changes over time, any state from state 1 to state 4 is the normal state of the virtual machines and state 5 and state 6 are anomalous, wherein, in state 1, the use ratio of the CPU, GPU and memory of a virtual machine is lower than 30%, and its I/O waiting time is shorter than the normal I/O waiting time;

in state 2, the use ratio of one or more of the CPU, GPU and memory of a virtual machine is higher than 30% but lower than 50%, and that of the other factors is lower than 30%; and it has a second I/O waiting time which is normal;

in state 3, the use ratio of one or more of the CPU, GPU and memory of a virtual machine is higher than 50% but lower than 80%, and that of other factors is lower than 50%; and it has a second I/O waiting time which is normal;

in state 4, the use ratio of one of the CPU, GPU and memory of a virtual machine is higher than 80% but lower than 90%, and that of other factors is lower than 80% and their changes are normal; and it has a third I/O waiting time which is longer than the normal one;

in state 5, the use ratio of one or more of the CPU, GPU and memory of a virtual machine is higher than 80% but lower than 90%, and that of other factors is lower than 80% and their changes are anomalous; and it has a third I/O waiting time and a fourth I/O waiting time which is longer than the third I/O waiting time;

in state 6, the use ratio of one or more of the CPU, GPU and memory of a virtual machine is higher than 90%, and that of others is lower than 80% and their changes are anomalous; and it has a fourth I/O waiting time.

3. The anomaly detection method for the virtual machine in the cloud system of claim 1, wherein, the HsMM is expressed by $\lambda=\{S, \pi, A, B, P\}$, and each parameter is defined as follows:

S is the state set of the HsMM, $S=\{s_1, s_2, \ldots, s_G\}$, where $s_g(1 \leq g \leq G)$ is the possible state of the HsMM at time t, and G is the total number of its states;

$\pi$ is the probability matrix of the initial state, $\pi=\{\pi_g\}$, $\pi_g=Pr[q_1=s_g]$, $1 \leq g \leq G$, in which, $\Sigma_g \pi_g=1$; $\pi_g$ refers to the probability of the HsMM in the state $s_g$ at time 1, A is the state transfer probability matrix, $A=\{a_{gi}\}$, $a_{gi}=Pr[q_{t+1}=s_i|q_t=s_g]$, $1 \leq g$, $i \leq G$, in which, $\Sigma_i a_{gi}=1$, $q_t$ is the state of HsMM at time t, $a_{gi}$ refers to the probability of the HsMM shifting from the state $s_g$ to the state $s_i$ at time t;

B is the observation value probability matrix, $B=\{b_g(v_k)\}$, $b_g(v_k)=Pr[O_t=V_k|q_t=s_g]$, $1 \leq k \leq K$, $1 \leq g \leq G$, in which, $o_t$ refers to the observation value of the HsMM at time t, $b_g(v_k)$ refers to the probability of the HsMM in the state $s_g$ at time t, and the observation value $O_t=V_k$, K is the maximum length of the observation sequence;

P is the state sustainability probability matrix, $P=\{p_g(d); 1 \leq d \leq D, 1 \leq g \leq G\}$, $p_g(d)=Pr[\tau_t=d|q_t=s_g]$ is the probability of the HsMM staying in the state $s_g$ at time t and remaining in that state until time d; wherein D is the longest time of the state sustainability.

4. The anomaly detection method for the virtual machines in a cloud system of claim 3, wherein, the process for training the HsMM by an observation sequence of the state attribute value of the virtual machines in the normal state includes:

S1. calculating a forward variable $\alpha_t^{(h)}(g,d)$ of each virtual machine's state information observation sequence $O^{(h)}(1 \leq h \leq H)$'s, which represents the probability of the virtual machine's sustained staying in the state $s_g$ until time d when the initial t observed values $o_1^t$ of arrive at the virtual machine's attribute information searching module, in which, $1 \leq t \leq T$;

and the forward variable is determined based on:

$$\alpha_t^{(h)}(g,d)=P_r[(o_1^t)_h,(q_t,\tau_t)=(s_g,d)] \quad (1)$$

in which, H is the total number of the virtual machine's state observation sequence, T* is the length of the corresponding observation sequence;

S2. calculating a probabilistic logarithm probability $P_h$ of each normal virtual machine's observation sequence corresponding to the HsMM respectively, $1 \leq h \leq H$, the probabilistic logarithm probability $P_{h*}$ of the online normal virtual machine, and the probabilistic logarithm probability $P_H$ of each normal virtual machine's observation sequence corresponding to the HsMM;

wherein $P_H$ is the initial probabilistic logarithm probability distribution by the probabilistic logarithmic value of the normal virtual machine:

$$P_h=\ln(P(O^{(h)}|\lambda))=\ln(\Sigma_{g=1}^G \Sigma_{d=1}^D \alpha_{T^*}^h((g,d)) \quad (2)$$

$$P_{h*}=\ln(P(O^{(h*)}|\lambda))=\ln(\Sigma_{g=1}^G \Sigma_{d=1}^D \alpha_{T^*}^{h*}((g,d)) \quad (3)$$

$$P_H=\Pi_{h=1}^H \ln(P(O^{(h)}|\lambda))=\Pi_{h=1}^H P_h \quad (4)$$

S3. calculating a mean value $\mu$ and a standard deviation $\sigma$ of the initial probabilistic logarithm probability distribution $P_H$ respectively as follows:

$$\mu=PH(5) \sigma=1H-1 \Sigma h=1H (Ph-\mu)2 (6)$$

S4. calculating a backward variable $\beta_t^{(h)}(g,d)$ of the observation sequence $O^{(h)}$ ($1 \leq h \leq H$) of each virtual machine, which represents the probability of the observation value $o_{t+1}^{T^*}$ when the observation value $o_1^t$ tat time t arrives at the virtual machine's attribute information searching module and when the virtual machine remains in the state $s_g$ until time d, and the definition of the backward variable is shown in formula (7):

$$\beta_t^{(h)}(g,d)=P_r[(o_{t+1}^{T^*})_h|(q_t,\tau_t)=(s_g,d)] \quad (7)$$

S5. determining based on the forward variable $\alpha_t^{(h)}(g,d)$ and the backward variable $\beta_t^{(h)}(g,d)$, a joint probability of the state shift $\xi_t^{(h)}(g,i)$, a joint probability of the sustained state $\eta_t^{(h)}(g,d)$, a joint probability of the state and the observation value $\gamma_t^{(h)}(g)$ obtained respectively by formulas (8), (9), (10):

$$\xi_t^{(h)}(g,i)=P_r[O^{(h)},q_{t-1}=s_g,q_t=s_i] \quad (8)$$

$$\eta_t^{(h)}(g,d)=P_r[O^{(h)},q_{t-1}\neq s_g,q_t=s_g,\tau_t=d] \quad (9)$$

$$\gamma_t^{(h)}=P_r[O^{(h)},q_t=s_g] \quad (10)$$

S6. assigning an initial value to the model parameters of the HsMM, to make $a_{gi}=1/(G-1)$, $\pi_g=1/g$, $p_g(d)=1/D$, $b_g(v_k)=1/(G-1)$; and the automatic state shift probability at $a_{gg}=0$, and upgrade the parameters according to formulas (11)-(14); when $o_t=v_k$, $\delta(o_t-v_k=1$; otherwise, $\delta(o_t-v_k)=0$;

$$\pi_g = \frac{\sum_{h=1}^H \frac{1}{P_h} \gamma_1^{(h)}(g)}{\sum_{h=1}^H \frac{1}{P_h} \sum_{g=1}^G \gamma_1^{(h)}(g)} \quad (11)$$

-continued $$a_{gi} = \frac{\sum_{h=1}^{H} \frac{1}{P_h} \sum_{t=2}^{T^*} \xi_t^{(h)}(g,i)}{\sum_{h=1}^{H} \frac{1}{P_h} \sum_{g=1}^{G} \sum_{t=2}^{T^*} \xi_t^{(h)}(g,i)} \quad (12)$$

$$b_g(v_k) = \frac{\sum_{h=1}^{H} \frac{1}{P_h} \sum_{t}^{T^*} \gamma_t^{(h)}(g)\delta(o_t - v_k)}{\sum_{h=1}^{H} \frac{1}{P_h} \sum_{k=1}^{K} \sum_{t}^{T^*} \gamma_t^{(h)}(g)\delta(o_t - v_k)} \quad (13)$$

S7. determining whether $P_H$ derived from S2 is a stable value; and when it is, the HsMM model parameter set λ is obtained, and the model training process ends; and when the $P_H$ derived from S2 is not stable, repeat steps S1 to S6.

5. The anomaly detection method for the virtual machines of a cloud system of claim 4, wherein, the distance between the initial probabilistic logarithm probability distribution of the normal virtual machine and the probabilistic logarithm probability of the online virtual machine in the cloud system is measured by the simplified Mahalanobis distance, based on the following:

$$d = \Sigma h^* = 1H\square\square\square Ph^* - \mu\sigma\square \quad (15)$$

wherein, the value of d shows the anomaly degree of the virtual machine's online state and behavior in the cloud system;

wherein a threshold value Q represents the normal behavior of the virtual machine and
when d≤Q, the state of the virtual machine is normal; and
when d>Q, the virtual machine is anomalous.

6. The anomaly detection method for the virtual machines of a cloud system of claim 5, wherein, when a virtual machine is detected operating anomalously, the anomaly detection and treatment system in the cloud system detects the anomaly, and appraises the detection result of the internal virus or the external attack to obtain the anomaly degree index of the virtual machine $E_i$, $E_i = \rho_1 + \rho_2$;
where $\rho_1$ is an index showing whether the anomalous virtual machine's virus can be treated such that when the virus is treatable, $\rho_1$ is 0;
when the virus is not treatable, $\rho_1$ is 1;
$\rho_2$ is an index showing whether the anomalous virtual machine's external attack is treatable;
such that when the external attack is treatable, $\rho_1$ is 0; and
when the external attack is not treatable, $\rho_2$ is 1; and
when a seriousness degree index of the anomalous virtual machine $E_i < E_{max} = 1$, the system issues warnings to the cloud renter of the anomalous virtual machine after removing the anomaly, and
when $E_i \geq E_{max} = 1$, the system will issue warnings to the cloud renter of the anomalous virtual machine and shut down the virtual machine.

* * * * *